(12) United States Patent
Hayashi et al.

(10) Patent No.: US 11,808,008 B2
(45) Date of Patent: Nov. 7, 2023

(54) CONSTRUCTION MACHINE

(71) Applicants: KOBELCO CONSTRUCTION MACHINERY CO., LTD., Hiroshima (JP); HIROSHIMA UNIVERSITY, Higashi-Hiroshima (JP)

(72) Inventors: Hideki Hayashi, Hiroshima (JP); Ryota Nakahara, Hiroshima (JP); Michio Hirayama, Hiroshima (JP); Kenjiro Kumitani, Hiroshima (JP); Taira Iji, Hiroshima (JP); Manabu Shimada, Hiroshima (JP)

(73) Assignees: KOBELCO CONSTRUCTION MACHINERY CO., LTD., Hiroshima (JP); HIROSHIMA UNIVERSITY, Higashi-Hiroshima (JP)

( * ) Notice: Subject to any disclaimer, the term of this patent is extended or adjusted under 35 U.S.C. 154(b) by 214 days.

(21) Appl. No.: 17/425,510

(22) PCT Filed: Jan. 14, 2020

(86) PCT No.: PCT/JP2020/000880
§ 371 (c)(1),
(2) Date: Jul. 23, 2021

(87) PCT Pub. No.: WO2020/158371
PCT Pub. Date: Aug. 6, 2020

(65) Prior Publication Data
US 2022/0098823 A1 Mar. 31, 2022

(30) Foreign Application Priority Data

Jan. 31, 2019 (JP) ................................ 2019-015508

(51) Int. Cl.
*B60K 11/00* (2006.01)
*E02F 9/08* (2006.01)
(Continued)

(52) U.S. Cl.
CPC ............ *E02F 9/0866* (2013.01); *B60K 11/04* (2013.01); *F01P 1/00* (2013.01); *F01P 11/10* (2013.01)

(58) Field of Classification Search
CPC . E02F 9/0866; F01P 1/00; F01P 11/10; B60K 11/04; B60K 11/06
(Continued)

(56) References Cited

U.S. PATENT DOCUMENTS 5,884,589 A * 3/1999 Sakamoto ............. F04D 29/526
123/41.49
6,192,839 B1 * 2/2001 Takeshita ................. F01P 11/12
165/41
(Continued)

FOREIGN PATENT DOCUMENTS

JP 5-46528 U 6/1993
JP 9-150636 A 6/1997
(Continued)

OTHER PUBLICATIONS

International Search Report dated Mar. 17, 2020 in PCT/JP2020/000880 filed Jan. 14, 2020, 3 pages.
(Continued)

*Primary Examiner* — Hau V Phan
(74) *Attorney, Agent, or Firm* — Oblon, McClelland, Maier & Neustadt, L.L.P.

(57) ABSTRACT

A construction machine is capable of reducing a decrease in work efficiency due to maintenance for capturing dust. The construction machine includes: an engine; a heat exchanger; a cooling fan that sucks air into an engine chamber to pass the air through the heat exchanger; an intake chamber independent of the engine chamber; an intake tube connected to the intake chamber; and a dust receiving part. The intake tube has a curved part, which has an outside inner (Continued)

wall surface allowing dust in the air to contact it. The dust receiving part is located downstream of the outside inner wall surface to be capable of receiving dust.

19 Claims, 10 Drawing Sheets

(51) Int. Cl.
    *B60K 11/04*     (2006.01)
    *F01P 1/00*     (2006.01)
    *F01P 11/10*     (2006.01)

(58) Field of Classification Search
    USPC ............................................... 180/68.1
    See application file for complete search history.

(56) References Cited

U.S. PATENT DOCUMENTS

| | | | |
|---|---|---|---|
| 7,758,680 B2* | 7/2010 | Oka | B62D 25/10 |
| | | | 55/482 |
| 9,212,465 B2* | 12/2015 | Miyachi | B60K 11/06 |
| 9,327,582 B2* | 5/2016 | Matsumiya | B60H 1/00378 |
| 10,156,059 B2* | 12/2018 | Tabuchi | E02F 9/0866 |
| 2008/0169142 A1* | 7/2008 | Kinoshita | B60K 11/08 |
| | | | 180/68.1 |
| 2008/0202451 A1 | 8/2008 | Taniuchi et al. | |
| 2008/0223319 A1* | 9/2008 | Nakashima | F01P 11/12 |
| | | | 165/41 |
| 2010/0089674 A1* | 4/2010 | Oka | B62D 25/10 |
| | | | 180/68.1 |
| 2012/0234513 A1* | 9/2012 | Watanabe | B60K 11/08 |
| | | | 165/41 |
| 2013/0081887 A1* | 4/2013 | Tsuchihashi | E02F 9/0866 |
| | | | 180/68.1 |
| 2013/0228388 A1* | 9/2013 | Ueda | E02F 9/0866 |
| | | | 180/68.1 |
| 2016/0258392 A1* | 9/2016 | Harris | B01D 46/64 |
| 2016/0356018 A1* | 12/2016 | Tabuchi | E02F 9/0866 |
| 2018/0156167 A1 | 6/2018 | Yamaguchi et al. | |

FOREIGN PATENT DOCUMENTS

| | | |
|---|---|---|
| JP | 2006-206034 A | 8/2006 |
| JP | 2010-229744 A | 10/2010 |
| JP | 2010-248782 A | 11/2010 |
| JP | 2013-83106 A | 5/2013 |
| JP | 2017-7579 A | 1/2017 |
| JP | 2018-21362 A | 2/2018 |

OTHER PUBLICATIONS

Extended European Search Report dated Jan. 5, 2022 in European Patent Application No. 20748054.2, 8 pages.

* cited by examiner

FIG.1
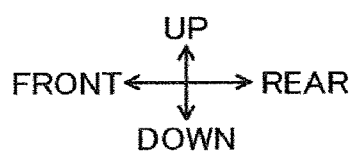
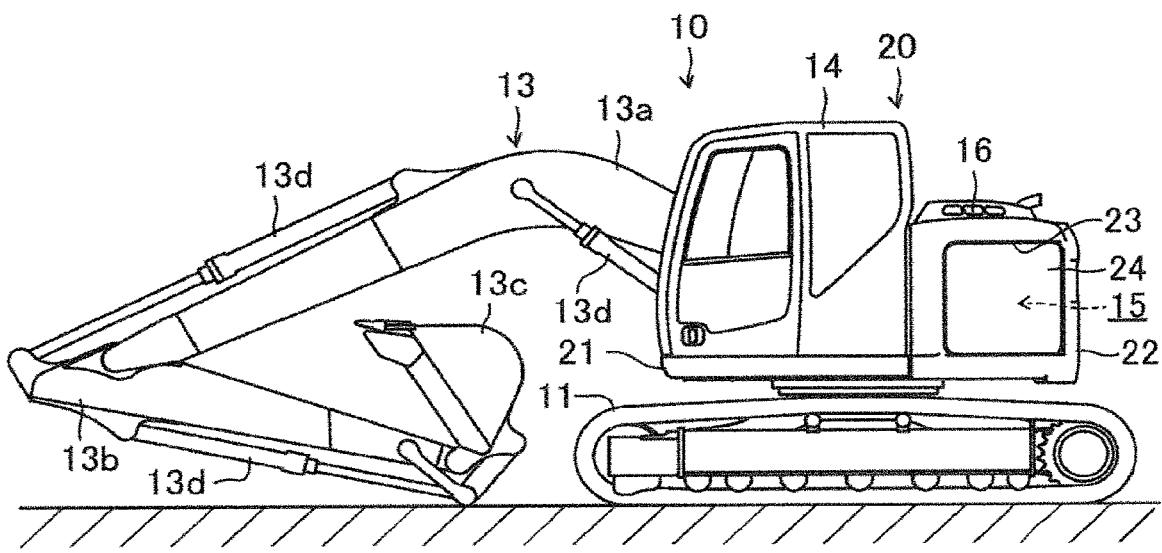

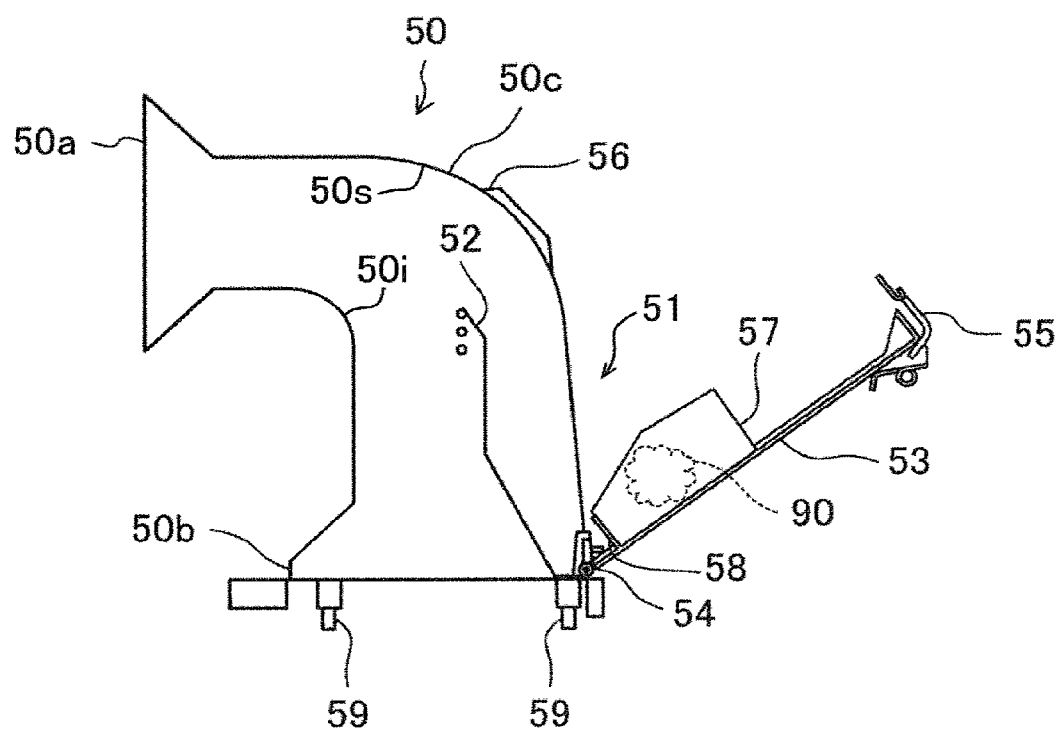
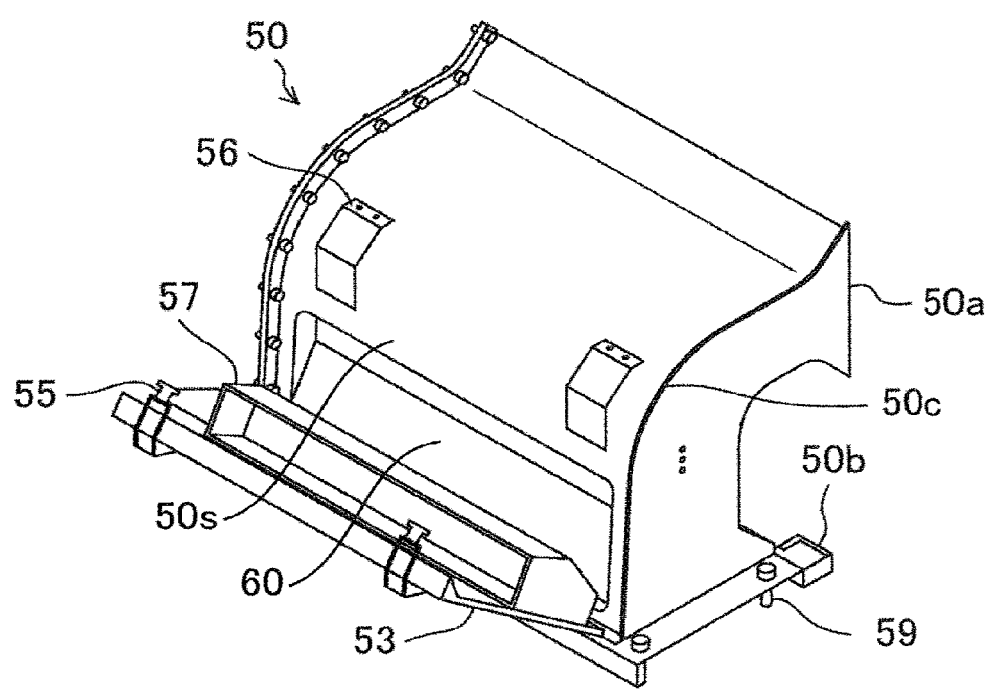

CONSTRUCTION MACHINE

TECHNICAL FIELD

The present invention relates to a construction machine with a heat exchanger that allows air to pass therethrough.

BACKGROUND ART

Conventionally known is a construction machine provided with an upper turning body including an engine chamber disposed at the rear thereof, in which chamber an engine and a heat exchanger are disposed.

For example, Patent Document 1 discloses a construction machine including a heat exchanger and an intake duct. The intake duct is disposed upstream of the heat exchanger so as to let an outside air taken in through the intake duct, namely, an external air, pass through the heat exchanger. The intake duct has an intake port, in which a dust filter is disposed. The dust filter captures dust in the air, thereby preventing the dust from clogging the heat exchanger. The dust filter, thus capturing dust in the air, allows clean air from which the dust has been removed to be led to the heat exchanger.

The dust filter, however, needs to be cleaned at a high frequency, which reduces the working efficiency of the construction machine. In general, a dust filter used in a construction machine includes a mesh capable of capturing dust or the like having a large size so as to cause clogging in a heat exchanger or the like, further causing dust or the like having a small size to adhere onto the mesh with an increase in the amount of dust or the like adhering to the mesh. The progress of such adhesion blocks the holes of the mesh to prevent air from normal circulation in the dust filter, thus causing overheating. It is, therefore, necessary to clean the dust filter before occurrence of a remarkable decrease in air circulation occurs.

In particular, in a construction machine used in an environment in which dust or the like is suspended in a large amount, such as an industrial waste site or a demolition site, cleaning of the dust filter is require to be performed frequently. This involves a significant reduction in the working efficiency of the construction machine.

CITATION LIST

Patent Literature

Patent Literature 1: Japanese Unexamined Patent Publication No. 2006-206034

SUMMARY OF INVENTION

It is an object of the present invention to provide a construction machine equipped with a heat exchanger allowing air to pass therethrough, the construction machine being capable of reducing the frequency of maintenance for removing dust from air.

Provided is a construction machine including: an engine chamber, an engine disposed in the engine chamber; a heat exchanger disposed in the engine chamber; an intake chamber communicated with the engine chamber and disposed independently of the engine chamber; an intake tube connected to the intake chamber so as to provide communication between the inside and the outside of the intake chamber; a cooling fan that sucks air outside the intake chamber into the engine chamber through the intake tube and the intake chamber to make the air pass through the heat exchanger; and a dust receiving part. The intake tube includes a connection part connected to the intake chamber, an intake port opened to the outside of the intake chamber, and a curved part having an inner wall surface positioned between the intake port and the connection part, the inner wall surface including an outside inner wall surface allowing dust contained in the air sucked through the intake port to come into contact with the outside inner wall surface. The dust receiving part is disposed on the downstream side of the outside inner wall surface so as to receive the dust having come into contact with the outside inner wall surface of the curved part to prevent the dust from entering the intake chamber.

BRIEF DESCRIPTION OF DRAWINGS

FIG. 1 is a side view of a construction machine according to an embodiment of the present invention.

FIG. 5 is a cross-sectional rear view showing a state where the outside wall part of the intake tube of the construction machine according to the embodiment is opened.

FIG. 6 is a perspective view showing the state shown in FIG. 5.

DESCRIPTION OF EMBODIMENTS

An embodiment of the present invention will be described below with reference to FIGS. 1 to 8.

Figure 2:
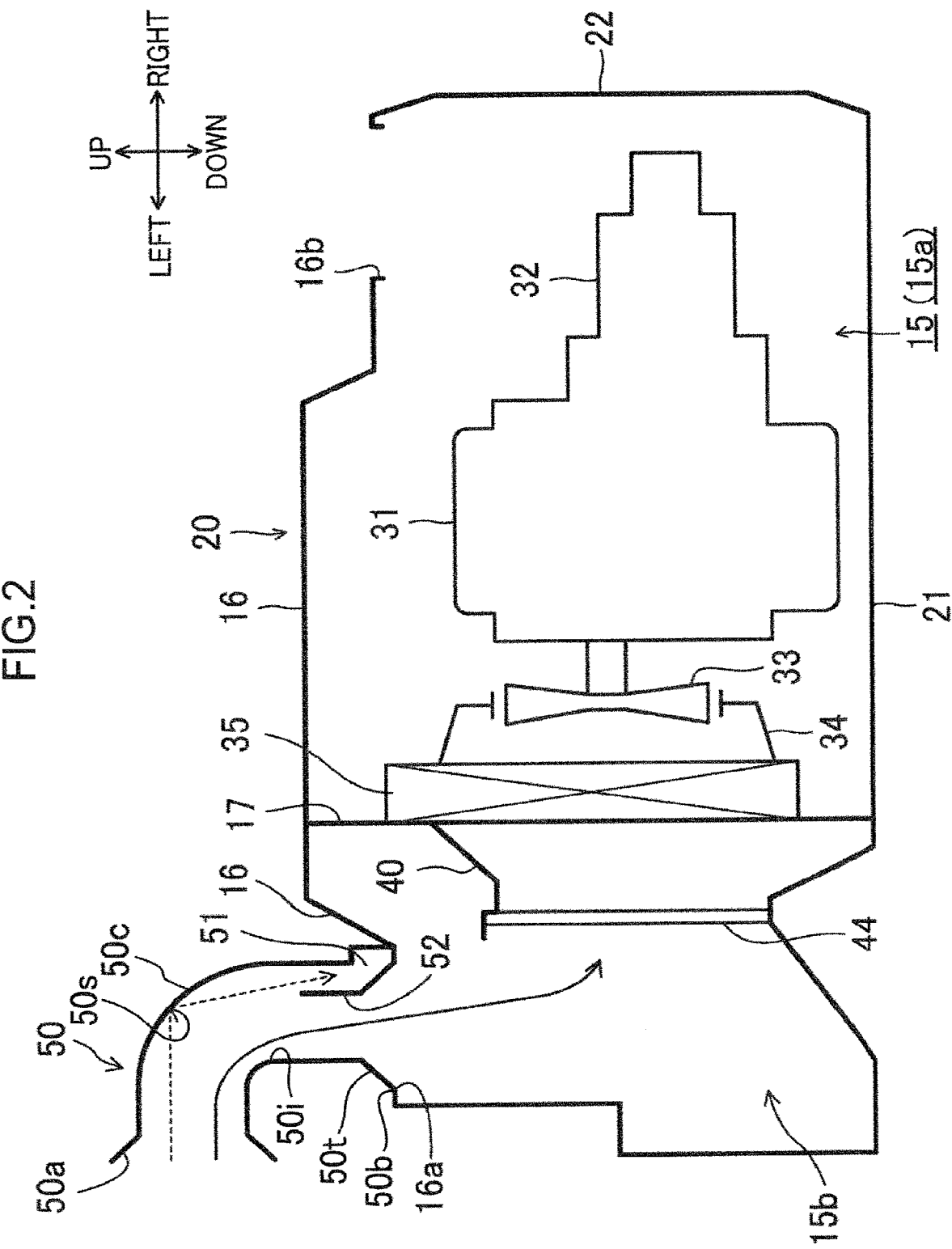
FIG. 2 is a cross-sectional rear view showing the interior of an engine chamber and an intake chamber of the upper turning body of the construction machine according to the embodiment.

FIGS. 1 and 2 show a construction machine 10 according to the embodiment. The construction machine 10 includes a crawler type lower traveling body 11 and an upper turning body 20 mounted on the lower traveling body 11 so as to be turnable. The upper turning body 20 includes an attachment 13, a cab 14, a machine room 15, and an upper frame 21. The construction machine 10 is, for example, a small turning type; that is, the upper turning body 20 has a small turning radius.

The attachment 13 is disposed in the front of the upper turning body 20, including a boom 13a, an arm 13b, a bucket 13c, and a plurality of hydraulic cylinders 13d. The plurality of hydraulic cylinders 13d make respective expansion and contraction motions under hydraulic control, thereby causing the boom 13a, the arm 13b, and the bucket 13c to make respective motions for excavation or the like. The operation of the attachment 13 is performed in the cab 14.

The upper frame 21 constitutes a lower part of the upper turning body 20. The cab 14 and the machine room 15 are disposed on the upper frame 21. The cab 14 is, for example, a rectangular box-shaped operation room adjacent to the attachment 13. The machine room is in the rear of the upper turning body 20.

The upper turning body 20 further includes a counterweight 22 and a machine-room cover 16 that define the machine room 15. The counterweight 22 is mounted on the upper frame 21 so as to form an outer peripheral edge of the rear of the upper turning body 20. The machine-room cover 16 covers the machine room 15 in cooperation with the counterweight 22. The counterweight 22 is arranged so as to secure the balance between the counterweight 22 and the attachment 13. A pair of maintenance openings 23 are formed to be located on both sides of the counterweight 22, allowing maintenance of various devices in the machine room 15 to be performed through the maintenance openings 23. The maintenance opening 23 is opened and closed by the rear cover 24.

The upper turning body 20 further includes an engine 31, a hydraulic pump 32, a heat exchanger 35, and a cooling device, which are disposed in the machine room 15. The engine 31, which includes a driving shaft, is disposed so as to orient the driving shaft in the right and left directions of the upper turning body 20. The cooling device, designed to make air for cooling the heat exchanger 35 in the machine room 15 flow, includes a cooling fan 33, a fan shroud 34, an intake duct 40, and a dust filter 44. The dust filter 44, the intake duct 40, the heat exchanger 35, the fan shroud 34, the cooling fan 33, the engine 31, and the hydraulic pump 32 are laterally aligned, that is, along the right and left directions of the upper turning body 20 (right and left directions in FIG. 2) in this order from the upper side in the direction of the flow of the air.

The machine room 15 contains a partition wall 17. The partition wall 17 partitions the machine room 15 into an engine chamber 15a and an intake chamber 15b which are independent of each other. In other words, the machine room 15 includes the engine chamber 15a and the intake chamber 15b. The partition wall 17 separates the engine chamber 15a and the intake chamber 15b from each other except for a limited communication path to let air pass through the heat exchanger 35, thereby making them be mutually independent chambers. The heat exchanger 35, the cooling fan 33, and the engine 31 are disposed in the engine chamber 15a, while the intake duct 40 and the dust filter 44 are disposed in the intake chamber 15b.

The heat exchanger 35 is composed of, for example, a radiator having a core surface. The heat exchanger 35 is disposed so as to orient the core surface in the right and left directions of the upper turning body 20. The cooling fan 33 is connected to one of opposite ends of the drive shaft of the engine 31 (the left end in FIG. 2), and disposed between the engine 31 and the heat exchanger 35. The fan shroud 34 covers the cooling fan 33 so as to enable the flow of air passing through the heat exchanger 35 toward the engine 31 to be efficiently formed. The hydraulic pump 32 is connected to the other of the opposite ends of the drive shaft of the engine 31 (the right end in FIG. 2). The intake duct 40 is disposed on the intake side of the heat exchanger 35 to guide air to the heat exchanger 35. The dust filter 44 is provided in the intake port of the intake duct 40 and captures such large-diameter dust as to cause clogging in the heat exchanger 35 and the like.

The construction machine 10 further includes an intake tube 50. The intake tube 50 is connected to the intake chamber 15b so as to provide communication between the inside and the outside of the intake chamber 15b (outside of the machine room 15). The intake tube 50 has an outer end enclosing an intake port 50a opened to the outside and a connection part 50b which is an inner end opposite thereto and connected to the intake chamber 15b. The connection part 50b is connected to the intake chamber 15b so as to be communicated with an opening 16a provided in a top wall of the intake chamber 15b. Specifically, in this embodiment, the top wall is composed of the left upper part of the machine-room cover 16 and the opening 16a is formed therein, and the connection part 50b is connected to the machine-room cover 16 so that the intake tube 50 covers the opening 16a. On the other hand, an exhaust port 16b is provided in a top wall of the engine chamber 15a, in this embodiment, in the right upper part of the machine-room cover 16.

The cooling fan 33 is driven by the engine 31, thereby forming a flow of air from the intake chamber 15b toward the engine chamber 15a, that is, a flow from the left side to the right side in this embodiment. The heat exchanger 35 provides heat exchange between refrigerant flowing in the heat exchanger 35 and the air to thereby cool the refrigerant. By the thus cooled refrigerant, the engine 31 and the like are cooled. Specifically, the rotation of the cooling fan 33 involved by the rotation of the drive shaft of the engine 31 causes outside air, i.e., the air outside the intake chamber 15b, to be taken into the intake chamber 15b through the intake tube 50. The thus taken-in air passes through the dust filter 44 and the intake duct 40 to enter the engine chamber 15a, and passes through the heat exchanger 35 while taking heat of the refrigerant flowing through the heat exchanger 35 to thereby become heated air, being discharged to the outside of the machine room 15 through the exhaust port 16b.

As the feature of the construction machine 10, the intake tube 50 includes a curved part 50c, and the construction machine 10 further includes a dust receiving part 51.

The curved part 50C is located between the intake port 50A and the connection part 50B, having an inner wall surface with a shape so curved as to make the direction of intake air in an upstream section from the intake port 50A to the curved part 50C different from the direction of intake air in a downward section from the curved part 50C to the connection part 50B. In this embodiment, the upstream section extends horizontally (in the right and left directions of the upper turning body 20), and the downstream section extends vertical direction. In the curved part 50C, the inner wall surface of the intake tube 50 is so curved as to continuously change the direction in which the inner wall surface of the intake tube 50 guides air from a horizontal direction in the upstream section to a vertical direction in the downstream section. This allows the dust contained in the air (outside air) having entered into the intake tube 50 through the intake port 50a to come into contact with the outside inner wall surface, which is the inner wall surface of the outside wall part 50s of the intake tube 50, out of the inner wall surface of the curved part 50c, as will be described in more detail later.

The outside wall part 50s of the intake tube 50 is a part of an outer wall constituting the intake tube 50, the part having a length larger than the length of the central axis of the intake tube 50 in a section including the central axis, i.e., in the longitudinal section shown in FIG. 2, that is, the part being a part outside the central axis. In the case where the curved part 50c is curved in a curved-line shape (for example, a circular arc shape as shown in FIG. 2) in the longitudinal section, the outside wall part 50s is a part having a radius of curvature larger than the radius of curvature of the central axis (the right part in FIG. 2). In other words, the longitudinal section is a cross section along the curve plane of the curved part 50c, the curve plane being a plane in which the curved part 50c is curved along the curve plane.

The outer wall constituting the intake tube 50 also includes an inner wall part 50i located on the side opposite to the outside wall part 50s. The inner wall part 50i is a part having a length smaller than the length of the central axis in the longitudinal section (the cross section along the curve plane), that is, the part on the inner side of the central axis. In the case where the curved part 50c is curved in a curved-line shape (for example, a circular arc shape as shown in FIG. 2) in the longitudinal section, the inner wall part 50i is a part having a radius of curvature smaller than the radius of curvature of the central axis (the left part in FIG. 2)

The dust receiving part 51 is disposed downstream of the outside inner wall surface with respect to the direction in which the sucked air flows on the outside inner wall surface of the curved part 50c (on the lower side in FIG. 2) so as to be capable of receiving dust that has come into contact with the outside inner wall surface, that is, the inner wall surface of the outside wall part 50s. The dust receiving part 51 according to this embodiment is defined by a downstream section of the outside wall part 50s of the intake tube 50 (the section from the curved part 50c to the connection part 50b) and a partition plate 52. As shown in FIG. 2, the partition plate 52 is provided inside the intake tube 50 so as to partition the downstream air passage enclosed by the downstream section into a dust receiving space for receiving the dust and a space other than the dust receiving space. The lower end of the partition plate 52 is joined with an outer part of the connection part 50b, that is, a downstream end of the outside wall part 50s, thereby constituting a closed lower end, i.e., a bottom part, of the dust receiving part 51.

The construction machine 10 enables a part or all of dust that is included in an air sucked into the intake tube 50 through the intake port 50a thereof and that is large enough to cause clogging in the heat exchanger 35 and the like to be separated from the air at the curved part 50c by utilization of the inertia of the dust and received and collected in the dust receiving part 51, thereby preventing the dust from entering the intake chamber 15b. Specifically, the air taken in through the air intake port 50a can smoothly change the direction thereof along the inner wall surface of the curved part 50c as indicated by a solid arrow in FIG. 2 whereas a part or all of the large-diameter dust having a weight greater than that of air fails to change the direction thereof in the curved part 50c differently from the air, brought into collision with the outside inner wall surface (the inner wall surface of the outside wall part 50s) of the curved part 50c, as shown by the broken line arrow in FIG. 2, thereafter falling along the inner wall surface of the downstream section of the curved part 50c and being directly received and collected in the dust receiving part 51 as it is. By the amount of the dust thus received in the dust receiving part 51, the amount of dust that will adhere to the dust filter 44 downstream thereof is reduced. This allows, even in the case of using the construction machine 10 in an environment where large amount of dust is suspended, the frequency of the cleaning work of the dust filter 44 to be reduced as compared with a conventional construction machine, thereby restraining work efficiency from being decreased by the cleaning operation. Besides, it is also possible to omit the dust filter 44 depending on the dust receiving efficiency of the dust receiving part 51.

Besides, the curved part 50c shown in FIG. 1, where the outside inner wall surface which is the inner wall surface of the outside wall part 50s has a curved-line shape, more preferably a circular arc shape, whose direction is smoothly changed, can restrain a vortex flow from being caused by a sudden change in air flow in the vicinity of the outside inner wall surface, thereby restraining intake efficiency from being decreased by the generation of the vortex flow.

Besides, curved at the right angle in the curved part 50c, the intake tube 50 allows dust to be effectively collected by the curved part 50c and the dust receiving part 51 with a reduced pressure loss of intake air. Specifically, the air flow direction in the intake tube 50 is converted from a horizontal direction or a substantially horizontal direction toward the curved part 50c from the intake port 50a to a vertical direction or a substantially vertical direction from the curved part 50c to the connection part 50b, which makes it possible to separate the dust sufficiently at the curved part 50c by utilization of the inertia of dust and to reduce pressure loss of the intake air effectively as compared with a case where the intake tube 50 is curved at an acute angle in the curved part 50c.

Thus, "the curved part is curved at a right angle" does not require the curve angle to be exactly coincident with 90° but permits the bending angle to be close to 90° enough to render the effects of separating dust and reducing pressure loss compatible. Specifically, the curve angle of the intake tube 50 in the curved part 50c is preferably set within a range of 85° or more and 95° or less. The lower limit value of the curve angle is more preferably 87.5°, more preferably 89°. The upper limit value of the bending angle is more preferably 92.5°, more preferably 91°.

In the construction machine 10 according to the above embodiment, the inner wall surface of a part in the vicinity of the intake port 50a of the intake tube 50 has a guide shape having a cross-sectional area that becomes smaller as it recedes from the intake port 50a. This allows the pressure loss to be further reduced.

In the construction machine 10 according to the above embodiment, the inner wall surface (the inner wall surface of the left side part in FIG. 2) enclosing the downstream end (the end including the connection part 50b, i.e., the lower end in FIG. 2) of the inner wall surface of the inner wall part 50i of the intake tube 50 has a shape expanding outward toward the connection part 50b, that is, a shape away from the inner wall surface of the outside wall part 50s. This reduces a sudden change in the cross-sectional area of the connection part 50b, restraining a vortex flow from being caused by a sudden change in the cross-sectional area in the vicinity of the connection part 50b, and thereby restraining intake efficiency from being lowered by the occurrence of the vortex flow.

According to the construction machine 10 of the present embodiment, the downstream section from the curved part 50c to the connection part 50b in the intake tube 50 is connected to the upper surface of the intake chamber 15b in a posture of extending vertically. This allows the dust that has come into collision with the inner wall surface of the curved part 50c to be efficiently collected in the dust receiving part 51 by use of the gravity acting on the dust.

Besides, the construction machine 10 according to the embodiment, including the intake duct 40 disposed in the intake chamber 15*b* and closely enclosing an intake-side space of the heat exchanger 35 and the dust filter 44 connected to the intake port of the intake duct 40 and configured to capture large-diameter dust that causes clogging in the heat exchanger 35 and the like, allows dust that is so large as to have failed to be collected by the dust receiving part 51 to be removed from air by the dust filter 44.

It is preferable that the dust receiving part 51 is configured to allow dust collected in the dust receiving part 51 to be taken out to the outside of the intake tube 50. This restrains the dust having been collected in the dust receiving part 51 from being increased to thereby become likely to scatter outward of the dust receiving part 51.

The dust receiving part 51 according to the embodiment further includes a dust case 57 for allowing the dust having been collected in the dust receiving part 51 to be taken out to the outside as described above. The structure with respect to the dust case 57 will be described with reference to FIGS. 3 to 8.

Figure 3:
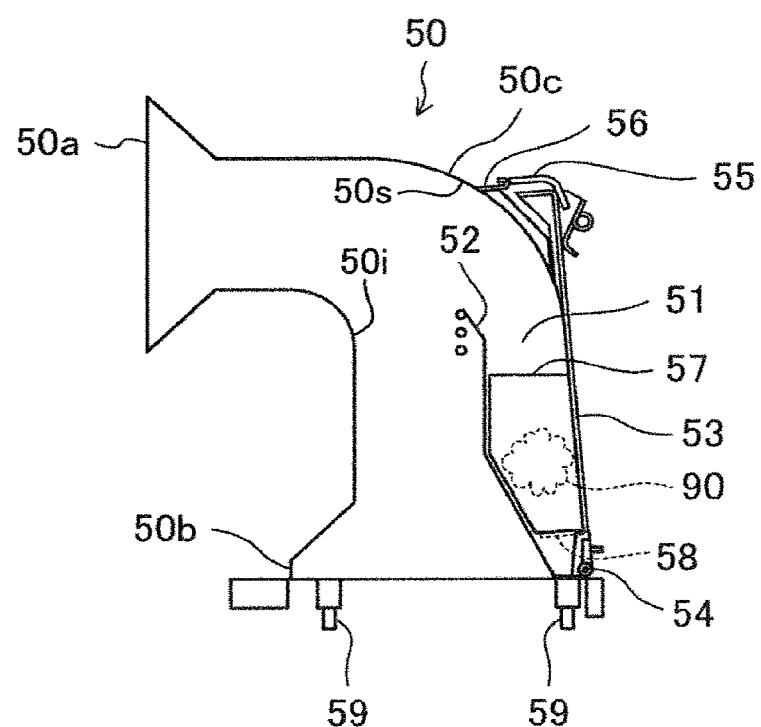
FIG. 3 is a sectional front view showing a normal state of an intake tube of a construction machine according to the embodiment.
Figure 4:
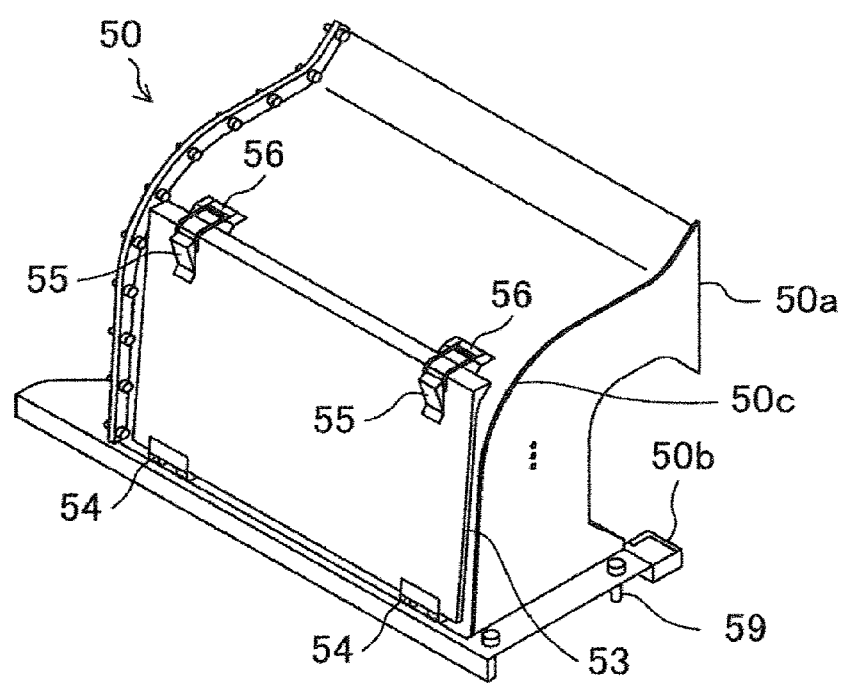
FIG. 4 is a perspective view showing the state shown in FIG. 3.
Figure 7:
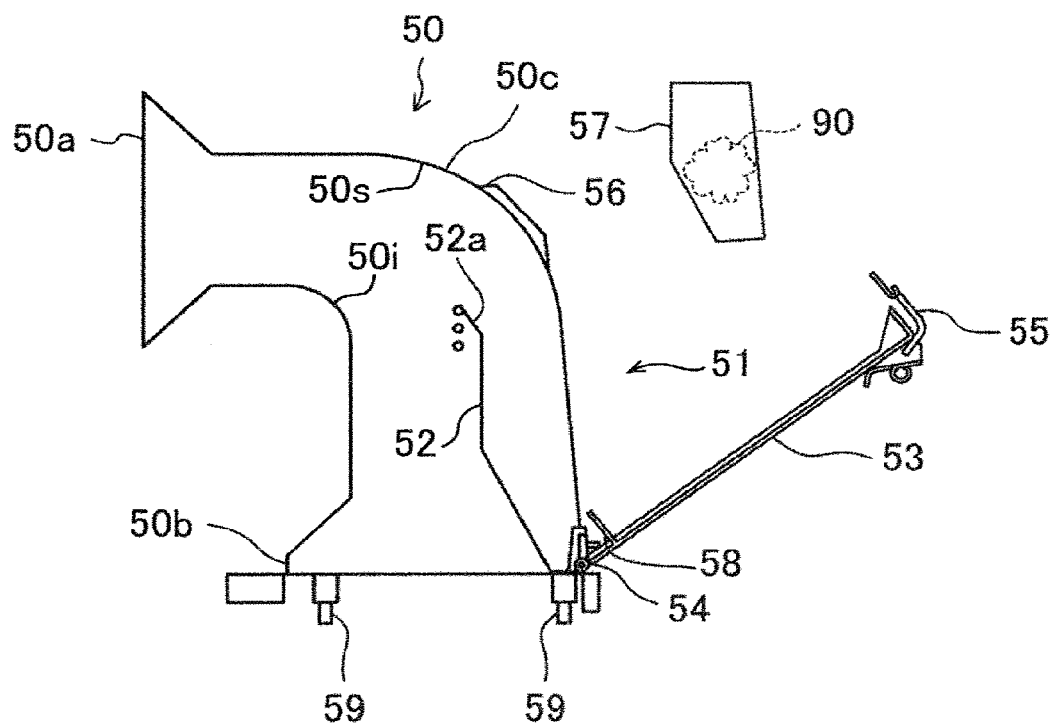
FIG. 7 is a cross-sectional rear view showing a state where the outside wall part of the intake tube of the construction machine according to the embodiment is opened and a dust case have been taken out.
Figure 8:
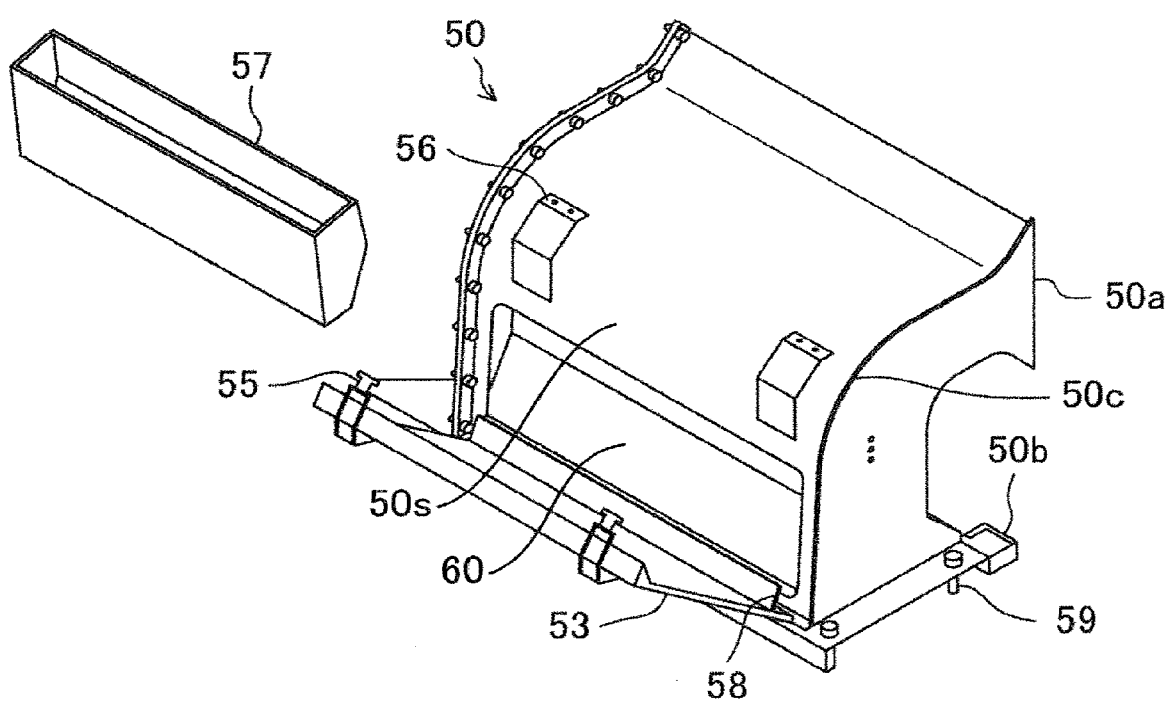
FIG. 8 is a perspective view showing the state shown in FIG. 7.

FIGS. 3 and 4 show a normal state of the intake tube 50; FIGS. 5 and 6 show a state where the wall part of the outer part of the intake tube 50 is opened; and FIGS. 7 and 8 show a state where the dust case 57 has been taken out by opening the wall part.

The intake tube 50 has a cylindrical outer wall, which includes a movable wall part 53 as shown in FIGS. 3 and 4 and an outer wall body other than the movable wall part 53. The movable wall part 53 constitutes a part located immediately outside the dust receiving part 51 of the outside wall part 50*s* of the outer wall, that is, a part located on the outer side of the central axis in a cross section along the curve plane as shown in FIG. 4, and is attached to the outer wall body so as to be rotationally movable to open and close an opening 60 that is formed in the outside wall part 50*s* as shown in FIGS. 6 and 8. Thus, the inside part of the dust receiving part 51 is formed of the partition plate 52 while the outside part thereof is formed of the movable wall part 53. In other words, the dust receiving part 51 is defined by the partition plate 52 and the movable wall part 53, between which a dust receiving space for receiving dust is secured.

The movable wall part 53 is movable between a closing position shown in FIGS. 3 and 4 and an opening position shown in FIGS. 5-8. The movable wall part 53 closes the opening 60 at the closing position to form the continuous outside wall part 50*s* as shown in FIGS. 3 and 4, while separates from the opening 60 to open the opening outward at the opening position.

The movable wall part 53 according to this example is attached to the wall body so as to be rotationally movable about a lower end of the movable wall part 53 around a horizontal axis. Specifically, the lower end of the movable wall part 53 and the lower end of the wall body, that is, the part constituting the connection part 50*b*, are connected to each other through a pair of hinge members 54. The pair of hinge members 54 are provided at respective positions that are spaced horizontally, and support the movable wall part 53 so as to allow the movable wall part 53 to be moved rotationally around the pair of hinge members 54.

On the other hand, the movable wall part 53 and the outer wall body is attached with a pair of movable-side lock members 55 and a pair of fixed-side lock members 56 for holding the movable wall part 53 at the closing position, respectively. The pair of movable-side lock members 55 are disposed at respective positions that are spaced horizontally in the upper end of the movable wall part 53. The pair of fixed-side lock members 56 are disposed in respective positions corresponding to the pair of movable-side lock members 55, that is, in respective positions spaced horizontally above the opening 60 (in the example shown in FIGS. 3-8, in a cross-over area from a position just above the opening 60 to the curved part 50*c*). The pair of movable-side lock members 55 and the pair of fixed-side lock members 56 are engageable with each other to hold the movable wall part 53 in the closing position by the engagement thereof.

The dust case 57 is detachably disposed between the movable wall part 53 and the partition plate 52, and constitutes the dust receiving part 51 in cooperation with the movable wall part 53 and the partition plate 52. The dust case 57 is held at a predetermined storage position in the intake tube 50 in an upward opening posture to allow the dust 90 falling from the outside inner wall surface of the curved part 50*c* to enter the dust case 57 to be stored therein. Specifically, fixing the movable wall part 53 at the closing position by the movable side and the fixed-side lock members 55 and 56 causes the dust case 57 to be sandwiched between the movable wall part 53 and the partition plate 52 to be fixed to the storage position.

The movable wall part 53 according to this example includes a holding part 58 for holding the dust case 57. This allows the dust case 57 to be moved from the closing position to the opening position together with the movable wall part 53 while being held by the movable wall part 53, and the movable wall part 53 is fixed to the closing position to fix the dust case 57 to the housing position. The dust case 57, alternatively, may be separated from the movable wall part 53 so as to be left in the intake tube 50 when the movable wall part 53 is at the opening position. Alternatively, it is also possible that the lower part of the partition plate 52 is tilted so as to approach the movable wall part 53 as it goes downward (that is, the dust receiving part 51 has a downward-narrowed shape) while the lower part of the dust case 57 is given a shape corresponding to the lower part of the partition plate 52. This allows the dust case 57 to be positioned by the dead weight of the dust case 57.

According to the above-described intake tube 50, fixing the movable wall part 53 to the closing position by the movable-side and the fixed-side lock members 55 and 56 as shown in FIGS. 3 and 4 allows air to be taken in in a normal state through the intake tube 50 and allows dust that has been separated from outside air by the curved part 50*c* to be stored in the dust case 57.

In contrast, moving the movable wall part 53 from the closing position to the opening position to open the opening 60 allows the dust 90 having been collected in the dust case 57 to be taken out together with the dust case 57. More specifically, successively performed are releasing the lock by the movable-side and the fixed-side lock members 55 and 56, moving the movable wall part 53 to the opening position together with the dust case 57 rotationally about the hinge member 54 as shown in FIGS. 5 and 6 and removing the dust case 57 from the movable wall part 53 as shown in FIGS. 7 and 8, which performances allow the dust 90 in the dust case 57 to be discarded. The dust 90 collected in the dust case 57, thus, can be easily taken out only by movement of the movable wall part 53 to the opening position.

The means for taking out the dust stored in the dust receiving part 51 to the outside of the intake tube is not limited to one including the dust case 57. For example, it is also possible that the movable wall part 53 in the opening position allows dust to be drawn out of the intake tube 50 as it is through the opening 60.

The connection part 50*b* of the intake tube 50 shown in FIGS. 3 to 8 is detachably attached to the top wall (the upper part of the machine-room cover 16) of the intake chamber 15*b* by use of fastening bolts 59. The specific means for connecting the intake tube 50 to the intake chamber 15*b*, however, is not limited thereto.

In the example shown in FIGS. 3, 5 and 7, the upper end 52*a* out of the opposite ends of the partition plate 52 in the flow direction of the intake air, that is, the end on the side closer to the curved part 50*c*, is bent inward of the intake tube 50 (i.e., toward the inner wall surface of the inner wall part 50*i*) corresponding to the curved shape of the curved part 50*c*. Thus widening the inlet of the dust receiving part 51 increases the probability of entry of dust that has come into collision with the outside inner wall surface of the curved part 50*c* to bounce back into the dust receiving part 51 (the dust case 57 in the example shown in FIGS. 3-8).

The specific shape and structure of the intake tube and the intake tube according to the present invention are not limited to the above embodiments. The shape and structure may be modified, for example, as follows.

Figure 9:
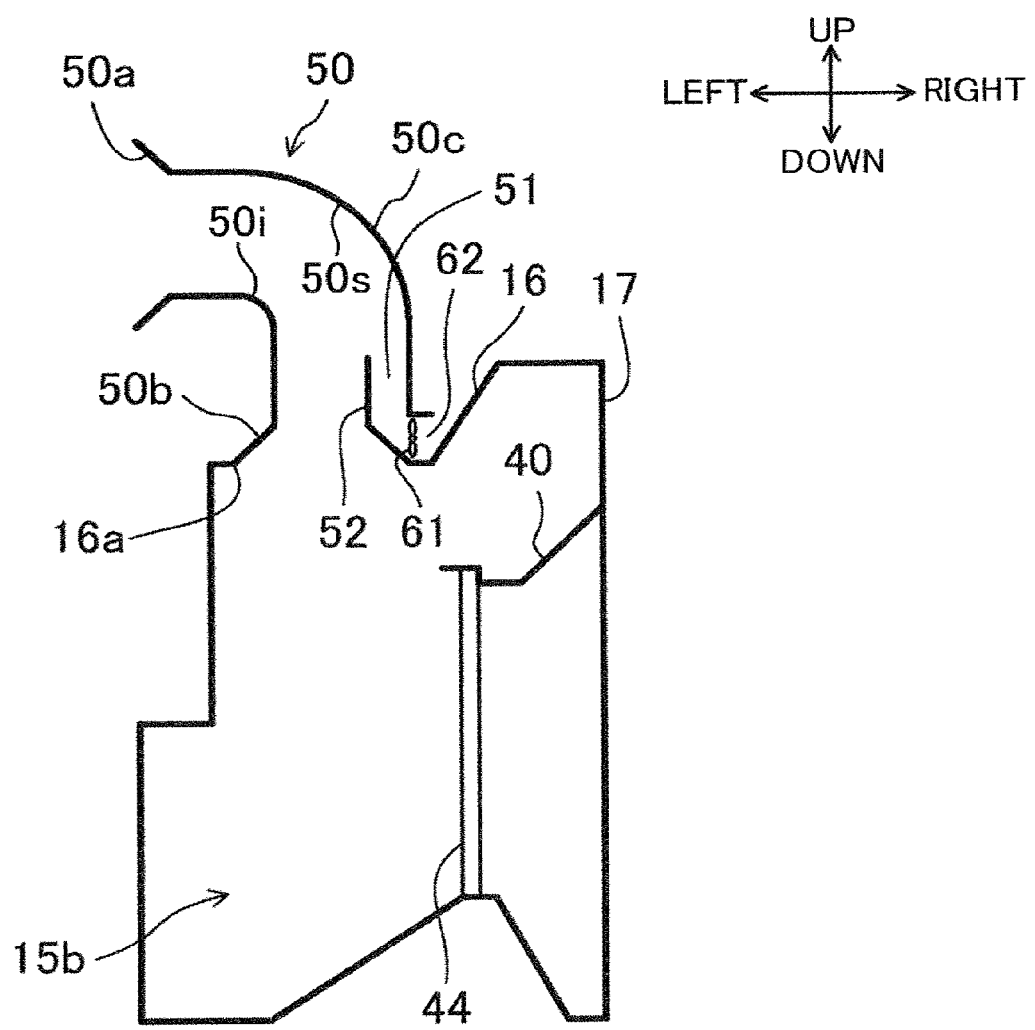
FIG. 9 is a cross-sectional rear view showing a first modification of the intake tube and the intake chamber.

FIG. 9 shows a first modification of the intake tube and the intake chamber. In FIG. 9, the same components as those included in the above-described embodiment shown in FIG. 2 are given the same reference numerals, and the description thereof will be omitted.

The construction machine according to the first modification further includes a suction fan 61 in addition to the components according to the above-described embodiment. The suction fan 61 is composed of a small-sized fan that is smaller than the cooling fan 33, configured to suck outside air so as to attract the outside air sucked from the intake port 50*a* of the intake tube 50 to the inside of the dust receiving part 51. The suction fan 61 can restrain the dust having entered the dust receiving part 51 from being scattered again to the outside of the dust receiving part 51.

The suction fan 61 according to the first modification is disposed so as to discharge the dust that the suction fan 61 have sucked into the dust receiving part 51 together with the air to the outside directly. Specifically, as shown in FIG. 9, the dust receiving part 51 is formed with an opening 62 that provides communication between the inside and the outside of the intake tube 50, and the suction fan 61 is disposed in the opening 62 or in the vicinity thereof. This allows the time and effort for discarding the dust received by the dust receiving part 51 to be saved. The opening 62, preferably, is disposed, for example, in the lower end of the outside wall part 50*s*, that is, the lower end of the dust receiving part 51 which is a wall constituting a part near the connection part 50B (the right part in FIG. 9).

Figure 10:
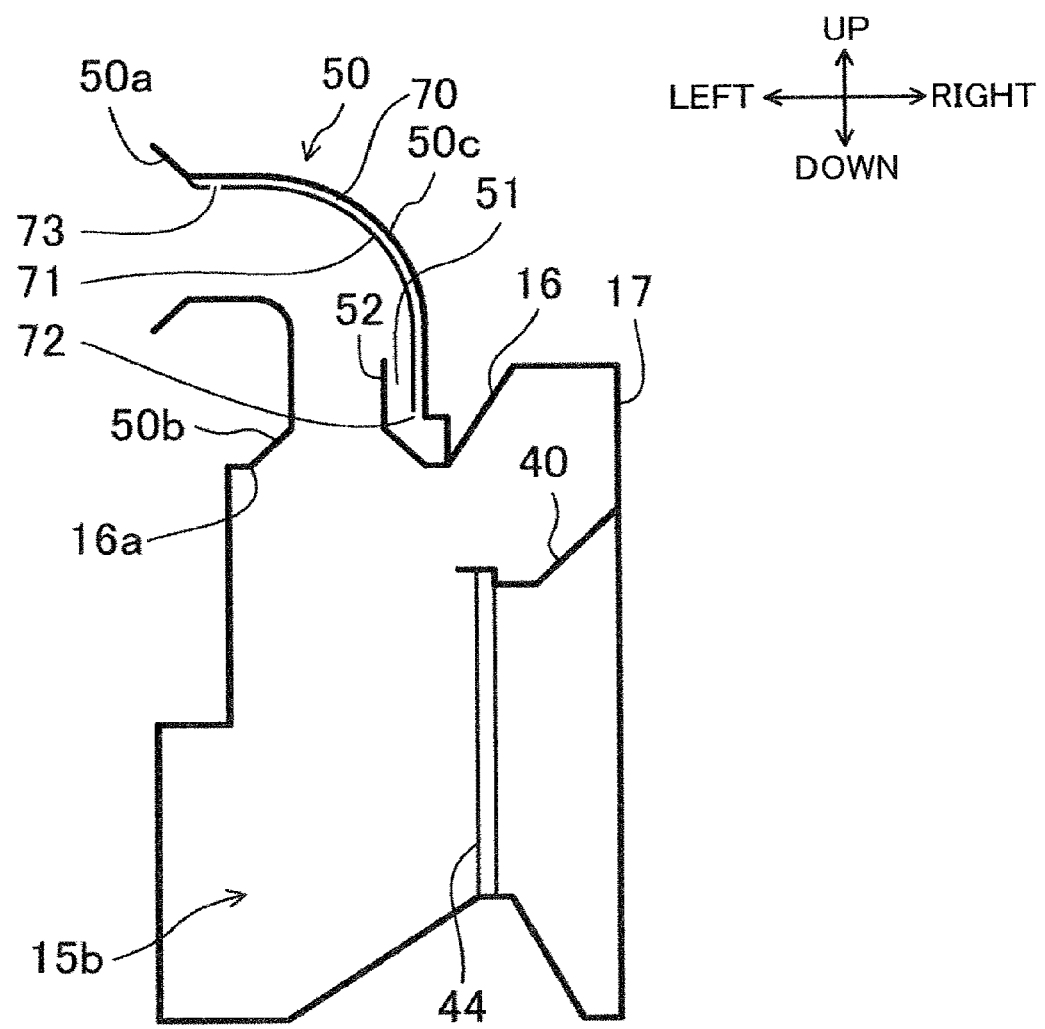
FIG. 10 is a cross-sectional rear view showing a second modification of the intake tube and the intake chamber.

FIG. 10 shows a second modification of the intake tube and the intake chamber. In FIG. 10, the same components as those included in the above-described embodiment shown in FIG. 2 are given the same reference numerals, and the description thereof will be omitted.

The intake tube 50 according to the second modification is formed with a return flow path 70. To reduce the pressure in the dust receiving part 51, the return flow path 70 is formed so as to allow only the air to return from the inside of the dust receiving part 51 to the vicinity of the intake port 50*a* while leaving dust inside the dust receiving part 51.

The return flow path 70 is formed along the inner wall surface of the outside wall part 50*s* of the intake tube 50. Specifically, a partition wall 71 is formed in the intake tube 50, extending along the inner wall surface of the outside wall part 50*s* of the intake tube 50 in a region from the inside of the dust receiving part 51 to the vicinity of the intake port 50*a* to thereby partition the space in the intake tube 50 into the return flow path 70, which is a space near the inner wall surface of the outside wall part 50*s*, and the space on the inner side of the return flow path 70. An opening 72 serving as an inlet of the return flow path 70 is formed in an end positioned in the dust receiving part 51, that is, the lower end, out of the opposite ends of the partition wall 71 in a flow direction of intake air in the intake tube 50, while an opening 73 serving as an outlet of the return flow path 70 is formed in an end positioned in the vicinity of the intake port 50*a*, that is, the upper end.

The return flow path 70 can solve the following problems (1) and (2). If there is no mechanism for reducing the pressure in the dust receiving part 51, it can involve the following problems: (1) the increase in pressure in the dust receiving part 51 may hinder dust from entering the dust receiving part 51; and (2) wind pressure may push out dust from the dust receiving part 51. The return flow path 70, which reduces the pressure in the dust receiving part 51, effectively restrains the problems (1) and (2) from occurring.

Furthermore, since the pressure in the intake tube 50 becomes lower as it approaches the intake port 50*a*, the pressure difference between the inlet communicated with the inside of the dust receiving part 51 and the outlet communicated with the space near the intake port 50*a* is great in the return flow path 70, which enables the pressure in the dust receiving part 51 to be effectively reduced.

The opening surface of the opening 73, which is the outlet of the return flow path 70, is preferably orthogonal to the opening surface of the intake port 50*a*. This restrains the flow of the air discharged through the opening 73 from inhibiting the flow of the outside air sucked through the intake port 50*a*, in spite of the position of the opening 73, which is the outlet of the return flow path 70, in the vicinity of the intake port 50*a*, thereby restraining the intake efficiency from being decreased. The description that the two opening surfaces are "orthogonal" does not intend to limit to a mode in which the crossing angles of the two openings are exactly 90°, but to widely encompass modes in which the crossing angle is approximated to 90° enough to provide the effect.

The position of the outlet of the return flow path 70 is not limited to the vicinity of the intake port 50*a*. The position of the outlet can be set at any position in a region outside the dust receiving part 51 and having a pressure lower than that inside the dust receiving part 51 in the intake tube 50.

The member for forming the return flow path 70 is not limited to the outside wall part 50*s* of the intake tube 50 and the partition wall 71. The return flow path 70 may be defined by, for example, a tube or the like that is led out from the inside of the dust receiving part 51 to the outside in the intake tube 50.

Figure 11:
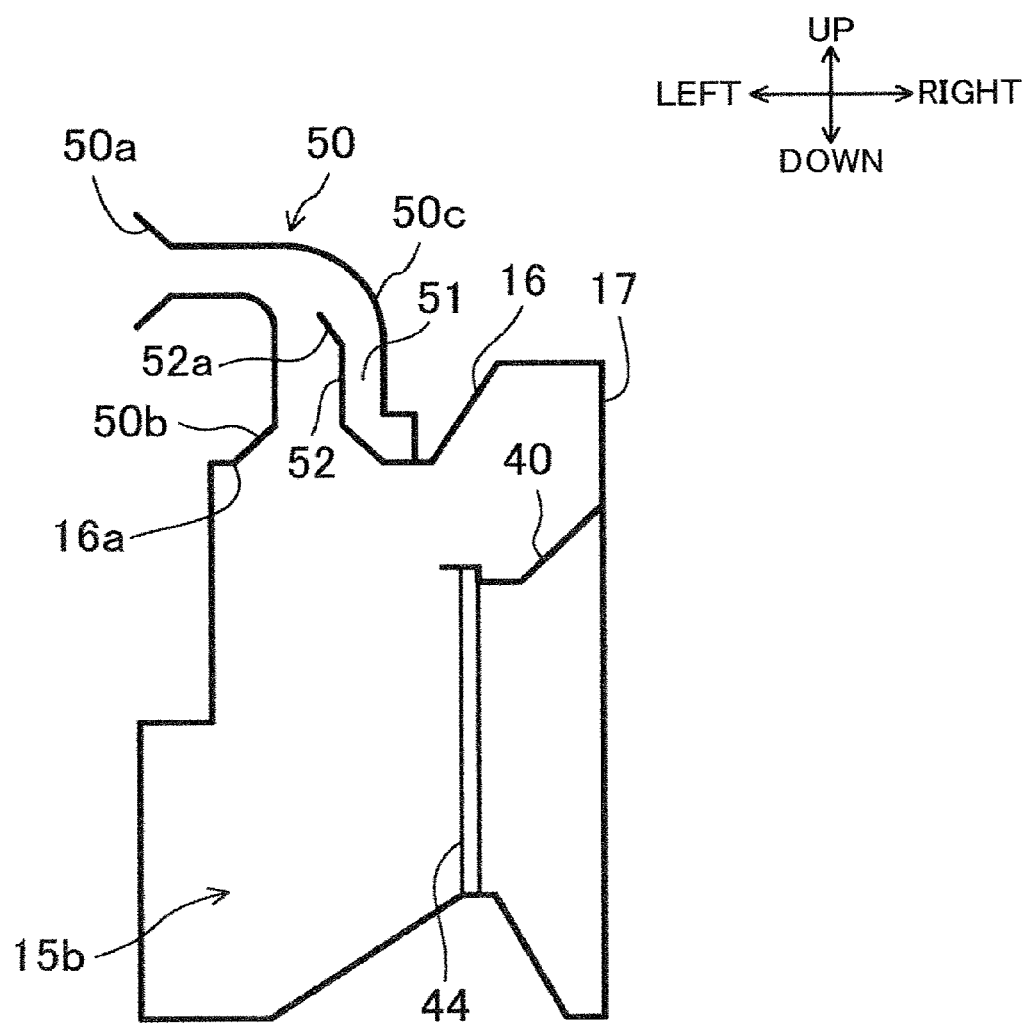
FIG. 11 is a cross-sectional rear view showing a third modification of the intake tube and the intake chamber.

FIG. 11 shows a third modification of the intake tube and the intake chamber. In FIG. 11, the same components as those included in the above-described embodiment shown in FIG. 2 are given the same reference numerals, and the description thereof will be omitted.

In the third modification, as shown in FIG. 11, at least the upstream section from the intake port 50*a* to the curved part 50*c* in the intake tube 50 has a cross-sectional area smaller than the area of the rotation plane of the cooling fan 33 shown in FIG. 2. The rotation plane of the cooling fan 33 is a circular surface corresponding to a rotation locus of a plurality of blades constituting the cooling fan 33 when viewed along a rotation axis direction of the cooling fan 33. The upstream section, having a cross-sectional area smaller than the area of such a rotation plane, renders the flow velocity of the intake air at the upstream section large to allow more dust to come into collision with the outside inner wall surface of the curved part 50c of the intake tube 50, thereby allowing more dust to be collected in the dust receiving part 51.

The cross-sectional area of the upstream section is, more preferably, further smaller than the cross-sectional area of the downstream section from the curved part 50c to the connection part 50b in the intake tube 50, as shown in FIG. 11. This renders the flow speed of intake air in the upstream section greater to allow more dust to come into collision with the outside inner wall surface to be recovered into the dust receiving part 51.

Figure 12:
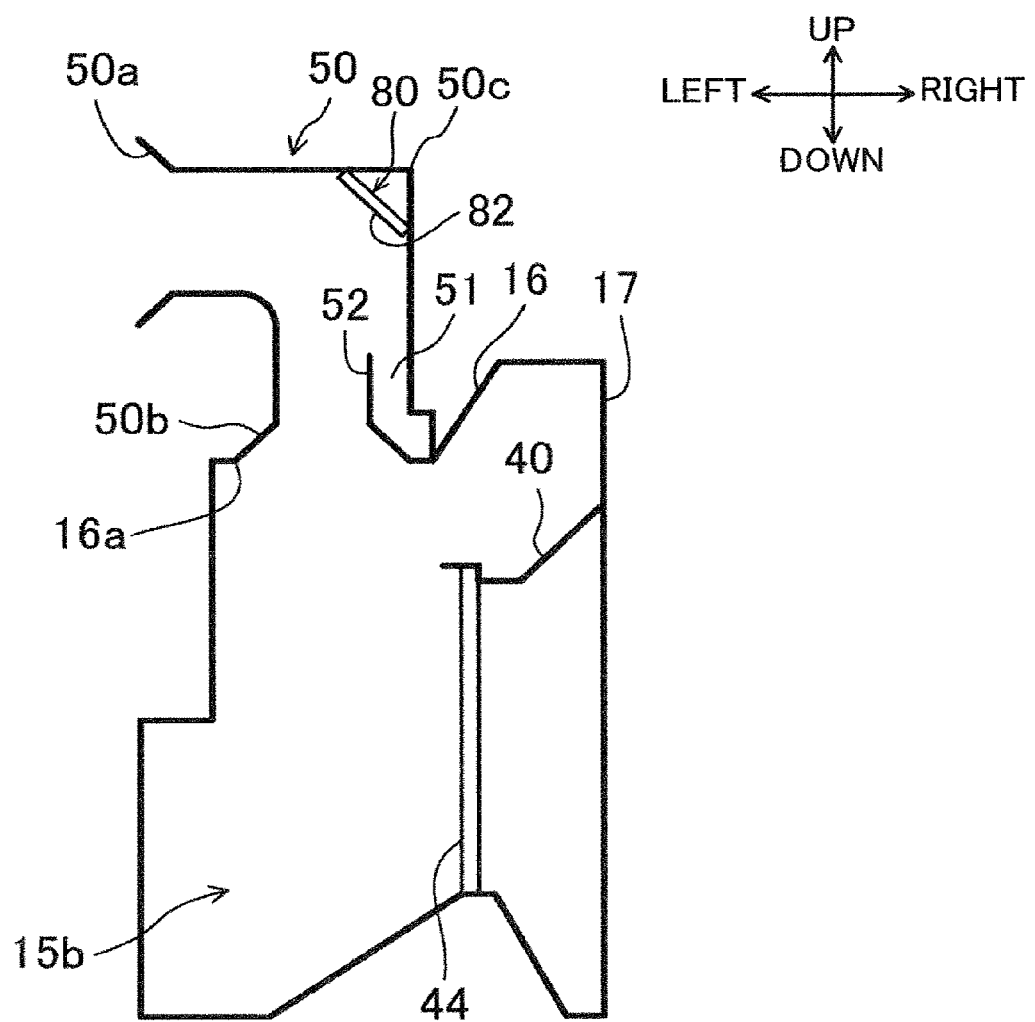
FIG. 12 is a cross-sectional rear view showing a fourth modification of the intake tube and the intake chamber.

FIG. 12 shows a fourth modification of the intake tube and the intake chamber. In FIG. 12, the same components as those included in the above-described embodiment shown in FIG. 2 are given the same reference numerals, and the description thereof will be omitted.

The inner wall surface of the curved part 50c of the intake tube 50 shown in FIG. 12, that is, the inner wall surface of the outside wall part 30s in the curved part 50c, is not circular-arc-shaped but an inclined plane in a cross section along the longitudinal section, namely, the curve plane, differently from the outside inner wall surface shown in FIG. 2. More specifically, the part corresponding to the curved part 50c out of the outside wall part 50s of the intake tube 50 is a corner part at which the outside wall part 50s is sharply bent at a right angle, and the intake tube 50 further includes a wind guide plate 80 disposed to cover the corner part on the inner side thereof. The wind guide plate 80 forms a guide surface 82, that is, an outside inner wall surface, which is inclined so as to allow the guide direction of the intake air to be shifted stepwise from the direction of the part upstream of the wind guide plate 80 out of the outside wall part 50s (namely, the horizontal direction in FIG. 12) to the direction of the part downstream of the wind guide plate 80 out of the outside wall part 50s (namely, the vertical direction in FIG. 12). The wind guide plate 80 is, thus, disposed in an posture inclined to the horizontal plane. The angle of the inclination is not limited but is preferably 45° or closer thereto in the example shown in FIG. 12. The wind guide plate 80 also can restrain a vortex flow from being caused by a sudden change in the intake direction in the curved part 50c to thereby restrain the intake efficiency from being decreased.

Figure 13:
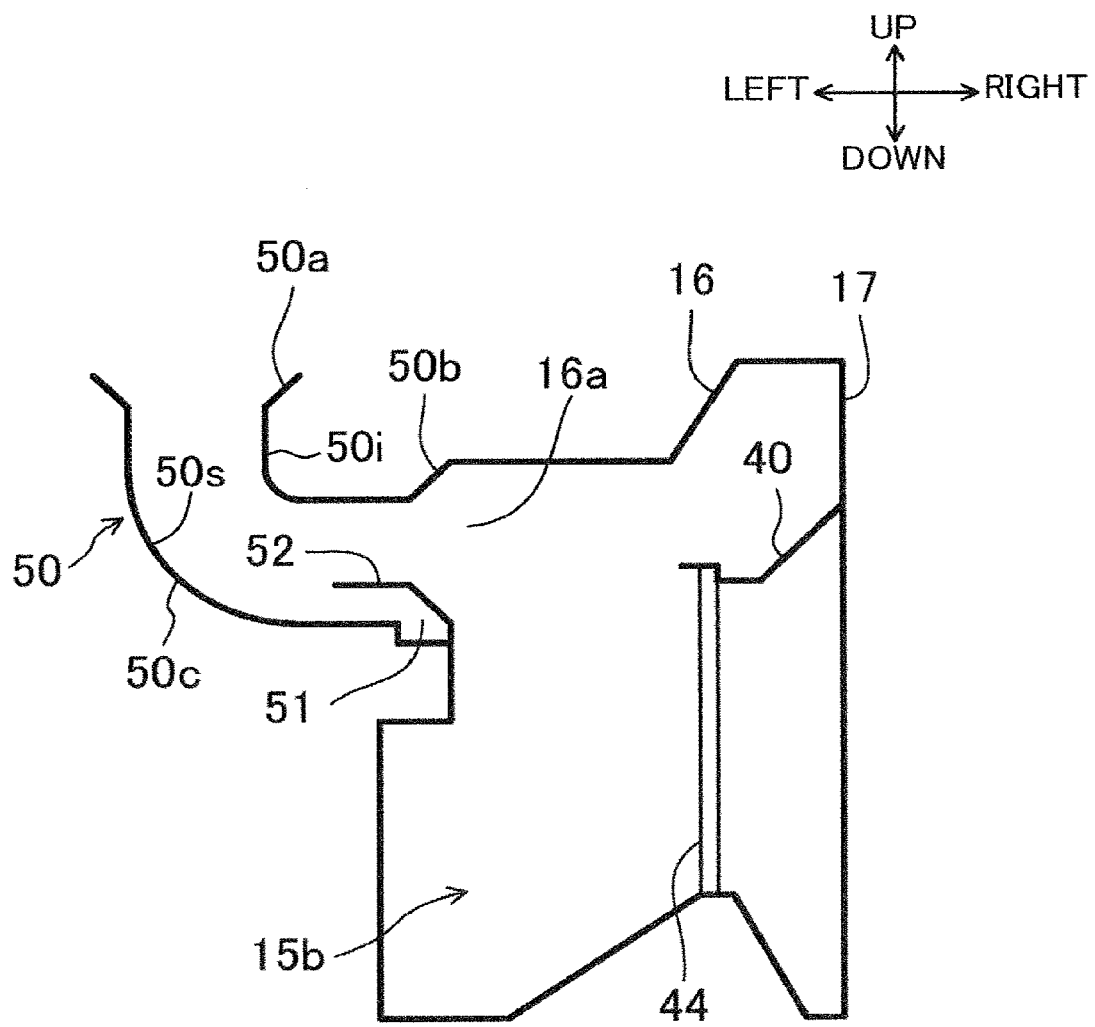
FIG. 13 is a cross-sectional rear view showing a fifth modification of the intake tube and the intake chamber.

FIG. 13 shows a fifth modification of the intake tube and the intake chamber. In FIG. 13, the same components as those included in the above-described embodiment shown in FIG. 2 are given the same reference numerals, and the description thereof will be omitted.

In the fifth modification, the intake tube 50 is connected not to the top wall but to the side wall of the intake chamber 15b. In the example shown in FIG. 13, the intake tube 50 is connected to the upper part of the left side wall of the intake chamber 15b. More specifically, an opening 16a opened sideward is provided to the upper part of a left side wall of a machine-room cover 16 constituting a side wall of the intake chamber 15b, and a connection part 50b of the intake tube 50 is attached to the side wall so as to cover the opening 16a.

Corresponding to such a connection part, the intake tube 50 is disposed in a posture in which a downstream section from a curved part 50c to a connection part 50b extends horizontally or substantially horizontally while an upstream section from an intake port 50a to the curved part 50c extends vertically downward. In this posture, the outside wall part 50s of the intake tube 50 is the lower part while the inner wall part 50i is an upper part, in the longitudinal section shown in FIG. 13 (the cross section along the curve plane). The inlet of a dust receiving part 51 is opened horizontally (in the left direction in FIG. 13) toward an outside inner wall surface that is an inner wall surface of the outside wall part 50s in the curved part 50c.

The intake tube 50 in such a posture also allows dust in intake air to come into collision with the outside inner wall surface which is the inner wall surface of the outside wall part 50s in the curved part 50c and to be collected thereafter in the dust receiving part 51 positioned sideward thereof.

In the present invention, the connection part at which the intake tube is connected to the intake chamber is, thus, unlimited. The direction in which the intake tube extends also can be set accordingly to the connection part.

The present invention is not limited to the embodiments and modifications described above, and allows various modifications. For example, any two or more modifications selected from the first to fifth modifications may be combined. That is, the description of the embodiments and variations described above is exemplary only and is not intended to limit the invention, its application, or its application.

For example, the construction machine according to the present invention is not limited to a hydraulic excavator including a bucket as a tip attachment, such as the construction machine 10 shown in FIG. 1. The present invention is widely applicable to any construction machine configured to allow outside air having passed through the heat exchanger to be sucked into an engine chamber.

The dust receiving section according to the present invention is not limited to one disposed inside the intake tube 50, such as the dust receiving part 51 shown in FIG. 2 and the like. The dust receiving part may be disposed outside the intake tube or at a position in the vicinity of a part where the intake tube is connected to the intake chamber in the intake chamber.

As described above, it is set to an object to provide a construction machine equipped with a heat exchanger allowing air to pass therethrough, the construction machine being capable of reducing the frequency of maintenance for removing dust from air.

Provided is a construction machine including: an engine chamber, an engine disposed in the engine chamber; a heat exchanger disposed in the engine chamber; an intake chamber communicated with the engine chamber and disposed independently of the engine chamber; an intake tube connected to the intake chamber so as to provide communication between the inside and the outside of the intake chamber; a cooling fan that sucks air outside the intake chamber into the engine chamber through the intake tube and the intake chamber to make the air pass through the heat exchanger; and a dust receiving part. The intake tube includes a connection part connected to the intake chamber, an intake port opened to the outside of the intake chamber, and a curved part having an inner wall surface positioned between the intake port and the connection part, the inner wall surface including an outside inner wall surface allowing dust contained in the air sucked through the intake port to come into contact with the outside inner wall surface. The dust receiving part is disposed on the downstream side of the outside inner wall surface so as to receive the dust having come into contact with the outside inner wall surface of the curved part to prevent the dust from entering the intake chamber.

This construction machine can restrain work efficiency from being decreased by maintenance for removing the dust, even when used in the outside air containing a large amount of floating dust.

Specifically, in the construction machine, some or all of large dust which may cause clogging in the heat exchanger or the like out of the dust contained in the air sucked from the intake port of the intake tube can be separated from the air in the curved part of the intake tube by utilization of the inertia thereof to be collected in the dust receiving part. Specifically, a part or all of large dust, being incapable of rapidly changing the direction thereof in the curved part unlike air, can be collected in the dust receiving part on the downstream side of the outside inner wall surface of the curved part after the collision with the outside inner wall surface.

The outside inner wall surface preferably has a circular arc shape in a cross section along a curve plane. The curve plane is a plane in which the curved part is curved along the curve plane.

The curved part having the outside inner wall surface having such a shape can restrain the intake direction in the curved part from being suddenly changed to restrain a vortex current from being caused by the sudden change, thereby restraining intake efficiency from being decreased.

Alternatively, it is also preferable that the curved part has a corner part and the intake tube further includes a wind guide plate disposed so as to cover the corner part to form the outside inner wall surface.

The outside inner wall surface makes it possible to restrain a vortex current, in spite of the curved part including the corner part, from being caused by a sudden change in the intake direction by covering the corner part, thereby restraining the intake efficiency from being decreased.

In the construction machine according to the present invention, the intake tube may be curved at a right angle at the curved part. "curved at a right angle" does not require the curve angle of the curved part to be exactly coincident with 90° but means a substantial "90°" in consideration of a production or attachment error or the like.

Such a curved part can achieve sufficient separation of dust using the inertia of the dust with a reduced pressure loss as compared with the case where the curve angle is an acute angle. In other words, the curve angle only has to be close to 90° enough to obtain the above technical effect, preferably from 85° to 95°, more preferably from 87.5° to 92.5°, and further preferably from 89° to 91°.

The construction machine may further include a suction fan for sucking air, which has entered the intake tube from the intake port, into the dust receiving section. The suction fan can restrain the dust having been collected in the dust receiving section from scattering again to the outside of the dust receiving section.

This case may include that the dust receiving part is provided with an opening communicated with the outside and that the suction fan is disposed in the opening or in the vicinity such that the dust sucked by the suction fan is discharged to the outside through the opening.

The opening allows the dust to be discharged to the outside through the opening as it is, together with the air having been sucked into the dust receiving section by the suction fan, thereby eliminating the necessity of discarding the dust collected in the dust receiving section.

It is preferable that a return flow path is formed in the intake tube, the return flow path formed so as to allow only the air to return upward to the inside of the intake tube and outside the dust receiving part while leaving the dust received in the dust receiving part to thereby reduce the pressure in the dust receiving part.

The return flow path can solve the following problems (1) and (2). If there is no mechanism for reducing the pressure in the dust receiving part, it may cause the problem (1) that the increase in pressure in the dust receiving part may hinder dust from entering the dust receiving part, and the problem (2) wind pressure may extrude dust in the dust receiving part out of the dust receiving part. The return flow path, reducing the pressure in the dust receiving section, restrains the aforementioned problems (1) and (2) from occurring.

The return flow path, preferably, extends from the inside of the dust receiving part to the vicinity of the intake port along the outside inner wall surface of the intake tube and has an inlet located inside the dust receiving part and an outlet in the vicinity of the inlet and the intake port. This renders the pressure difference between the inlet (i.e., the opening communicated with the interior of the dust receiving part) and the outlet (i.e., the opening communicated with the space near the inlet) so large as to allow the pressure in the dust receiving part to be more effectively reduced.

In this case, it is preferable that the outlet of the return flow path has an opening surface perpendicular to the opening surface of the intake port. "Orthogonal" of the two opening surfaces is not limited to a mode in which the intersection angles of the two openings are exactly 90°, and the crossing angle is approximated to 90° to such a degree that the effect can be obtained. In spite of the fact that the outlet is located in the vicinity of the intake port in the return flow path, the air flow discharged through the outlet inhibits the flow of the air sucked through the inlet port, thereby reducing the deterioration of the intake efficiency.

It is preferable that an upstream section from the intake port to the curved part in the intake tube has a cross-sectional area smaller than the area of the rotation plane of the cooling fan. The rotation plane of the cooling fan is a circular surface corresponding to a rotation locus of a plurality of blades constituting the cooling fan when viewed along a rotation axis direction of the cooling fan. The upstream section having such a small cross-sectional area renders the flow speed of intake air at the upstream section large to allow more dust to come into collision with the outside inner wall surface of the curved part, thereby allowing more dust to be collected in the dust receiving part.

In this case, it is more preferable that the cross-sectional area of the upstream section is smaller than the cross-sectional area of a downstream section from the curved part to the connection part in the intake tube. This renders the flow speed of the intake air at the upstream section further large to thereby allow more dust to come into collision with the outside inner wall surface of the curved part to be collected in the dust receiving part.

It is preferable that the intake tube includes a vicinal part of the intake port in the intake tube, the vicinal part having a guide shape having a cross-sectional area that becomes smaller as it recedes from the intake port. This allows pressure loss at the time of intake air to be restrained.

The dust receiving part, preferably, is configured to allow dust that has been collected in the dust receiving part to be taken out to the outside of the intake tube. The dust removal allows dust from being scattered out of the dust receiving part by increase in the amount of dust that has collected in the dust receiving part.

The intake tube may include a partition plate that partitions the inside of a downstream section from the curved part to the connection part in the intake tube into a dust receiving space for receiving the dust and a space other than the dust receiving space, the dust receiving part being defined by the partition plate and the outside wall part of the downstream section. This allows the dust receiving section to be configured with a simple structure.

In this case, it is preferable that the dust receiving part includes a dust case that accommodates the collected dust and is attachable to and detachable from the intake tube, and the outside wall part of the downstream section is configured to be capable of opening the dust case to the outside of the intake tube. This allows the dust stored in the dust case to be easily taken out of the intake tube together with the dust case.

Preferably, the partition plate has opposite ends in the flow direction of the intake air in the intake tube and one end of the opposite ends on the side closer to the curved part is bent inward of the intake tube correspondingly to the curved part. Thus expanding the inlet of the dust receiving part allows the probability that the dust having come into collision with the inner wall surface of the curved part enters the dust receiving part to be high.

It is preferable that the intake tube has an inner wall part with an inner wall surface including a part that encloses the downstream end of the intake tube and has a shape expanding outward toward the connection part. This restrains the cross-sectional area between the connection part and the intake chamber from being suddenly changed, restraining a vortex current from being caused in the vicinity of the connection part by the sudden change in the cross-sectional area and thereby restraining the intake efficiency from being decreased by the occurrence of the vortex current.

Preferably, a section from the curved part to the connection part in the intake tube extends along a vertical direction. This enables dust that has come into collision with the inner wall surface of the curved part to be collected into the dust receiving part efficiently by use of gravity.

The construction machine preferably further includes a duct disposed in the intake chamber and hermetically enclosing a space on an intake side of the heat exchanger, and a dust filter provided in the intake port of the duct to capture dust contained in the air.

The dust filter can capture dust that has failed to be collected in the dust receiving part out of dust having a size enough to cause clogging in the heat exchanger or the like. In other words, the dust receiving part can reduce the amount of dust to be captured by the dust filter to thereby reduce the frequency of maintenance (cleaning) or the like of the dust filter.

The invention claimed is:

1. A construction machine comprising:
an engine chamber;
an engine disposed in the engine chamber;
a heat exchanger disposed in the engine chamber;
an intake chamber communicated with the engine chamber and disposed independently of the engine chamber;
an intake tube connected to the intake chamber so as to provide communication between an inside and an outside of the intake chamber;
a cooling fan that sucks air outside the intake chamber into the engine chamber through the intake tube and the intake chamber to make the air pass through the heat exchanger; and
a dust receiving part, wherein:
the intake tube includes a connection part connected to the intake chamber, an intake port opened to the outside of the intake chamber, and a curved part having an inner wall surface positioned between the intake port and the connection part and curved, the inner wall surface including an outside inner wall surface allowing dust contained in the air sucked through the intake port to come into contact with the inner wall surface; and
the dust receiving part is disposed downstream of the outside inner wall surface so as to receive dust that has come into contact with the outside inner wall surface of the curved part to prevent the dust from entering the intake chamber.

2. The construction machine according to claim 1, wherein the outside inner wall surface of the curved part has a circular arc shape in a cross section along a curve plane, which is a plane in which the curved part is curved along the curve plane.

3. The construction machine according to claim 1, wherein the curved part has a corner part, and the intake tube includes a wind guide plate that is provided so as to cover the corner part and forms the outside inner wall surface.

4. The construction machine according to claim 1, wherein the intake tube is curved at a right angle at the curved part.

5. The construction machine according to claim 1, further comprising a suction fan that sucks air, which has entered the intake tube from the intake port, into the dust receiving part.

6. The construction machine according to claim 5, wherein the dust receiving part is provided with an opening communicated with outside, and the suction fan is disposed in the opening or in the vicinity of the opening such that the dust sucked by the suction fan is discharged to the outside through the opening.

7. The construction machine according to claim 1, wherein a return flow path is formed in the intake tube, and the return flow path is formed so as to allow only the air to return upward to the inside of the intake tube and to the outside of the dust receiving part while leaving the dust having been received in the dust receiving part to thereby reduce a pressure in the dust receiving part.

8. The construction machine according to claim 7, wherein the return flow path extends from an inside of the dust receiving part to a vicinity of the intake port along the outside inner wall surface of the intake tube, and has an inlet positioned inside the dust receiving part and an outlet positioned in the vicinity of the intake port.

9. The construction machine of claim 8, wherein the outlet of the return flow path has an opening surface perpendicular to an opening surface of the inlet.

10. The construction machine according to claim 1, wherein an upstream section, which is a section from the intake port to the curved part in the intake tube, has a cross-sectional area smaller than an area of a rotation plane of the cooling fan.

11. The construction machine according to claim 10, wherein the cross-sectional area of the upstream section of the intake tube is smaller than a cross-sectional area of a downstream section that is a section from the curved part to the connection part in the intake tube.

12. The construction machine according to claim 1, wherein the intake tube has a part in a vicinity of the intake port, the part having a guide shape that becomes smaller as it recedes from the intake port.

13. The construction machine according to claim 1, wherein the dust receiving part is configured to allow dust collected in the dust receiving part to be taken out to the outside of the intake tube.

14. The construction machine according to claim 1, wherein the dust receiving part is defined by a partition plate, which partitions the inside of a downstream section that is a section from the curved part to the connection part in the intake tube into a dust receiving space for receiving the dust and a space other than the dust receiving part, and an outside wall part of the downstream section.

15. The construction machine according to claim 14, wherein the dust receiving part includes a dust case that accommodates the collected dust and is attachable to and detachable from the intake tube, and the outside wall part of the downstream section is configured to be capable of opening the dust case to the outside of the intake tube.

16. The construction machine according to claim 14, wherein the partition plate has opposite ends in a direction of a flow of intake air in the intake tube, one end on a closer side to the curved part out of opposite ends being bent inward of the intake tube correspondingly to the curved part.

17. The construction machine according to claim 1, wherein the intake tube has an inner wall part with an inner wall surface including a part that encloses a downstream end of the intake tube and has a shape expanding outward toward the connection part.

18. The construction machine according to claim 1, wherein a section from the curved part to the connection part in the intake tube extends along a vertical direction.

19. The construction machine according to claim 1, further comprising a duct disposed in the intake chamber and hermetically enclosing a space on an intake side of the heat exchanger, and a dust filter provided in the intake port of the duct to capture dust contained in the air.

* * * * *